April 13, 1926.

H. H. OSBORN 1,580,319

TIMING DEVICE FOR DENTAL X-RAY MACHINES

Filed March 18, 1920       4 Sheets-Sheet 1

Inventor
Howard H. Osborn
By Munday,
Clarke & Carpenter Attys.

April 13, 1926.
H. H. OSBORN
1,580,319
TIMING DEVICE FOR DENTAL X-RAY MACHINES
Filed March 18, 1920      4 Sheets-Sheet 2
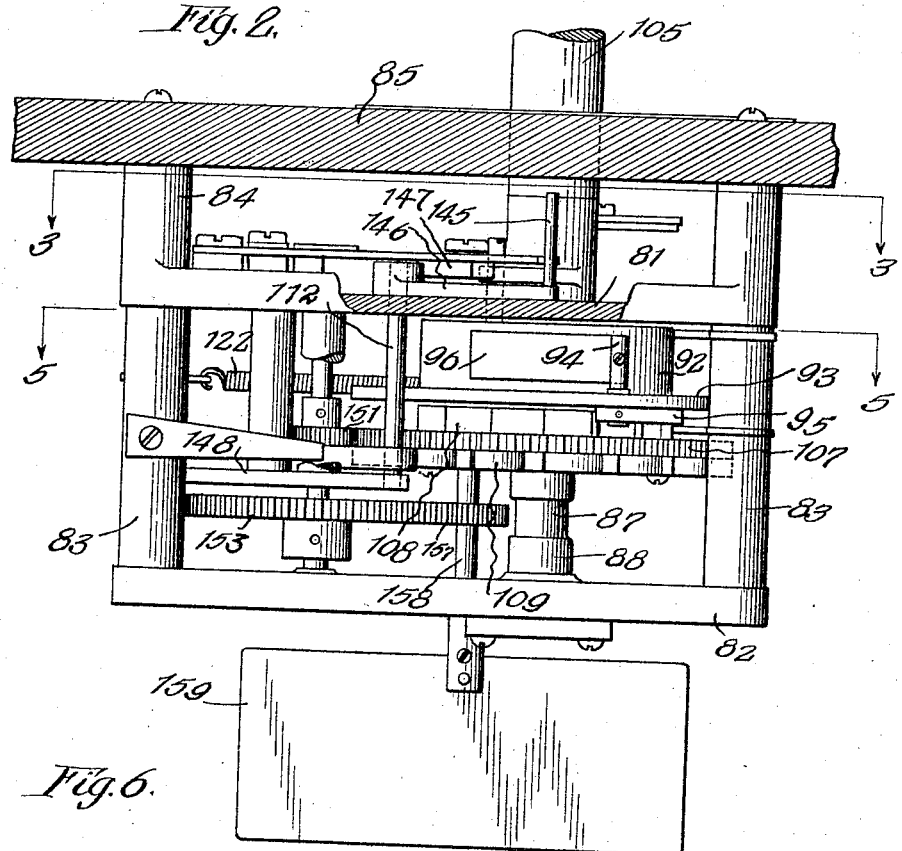
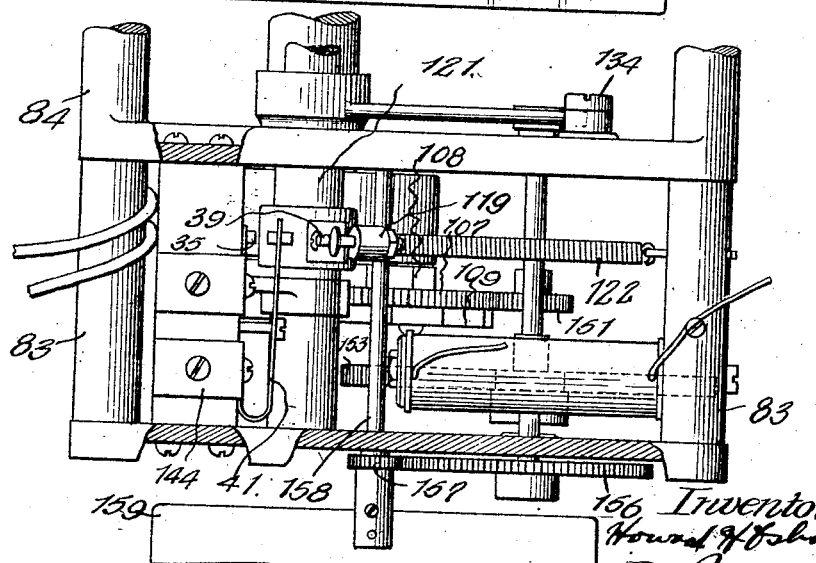

April 13, 1926.

H. H. OSBORN

TIMING DEVICE FOR DENTAL X-RAY MACHINES

Filed March 18, 1920    4 Sheets-Sheet 3

1,580,319

April 13, 1926.
H. H. OSBORN
1,580,319
TIMING DEVICE FOR DENTAL X-RAY MACHINES
Filed March 18, 1920  4 Sheets-Sheet 4
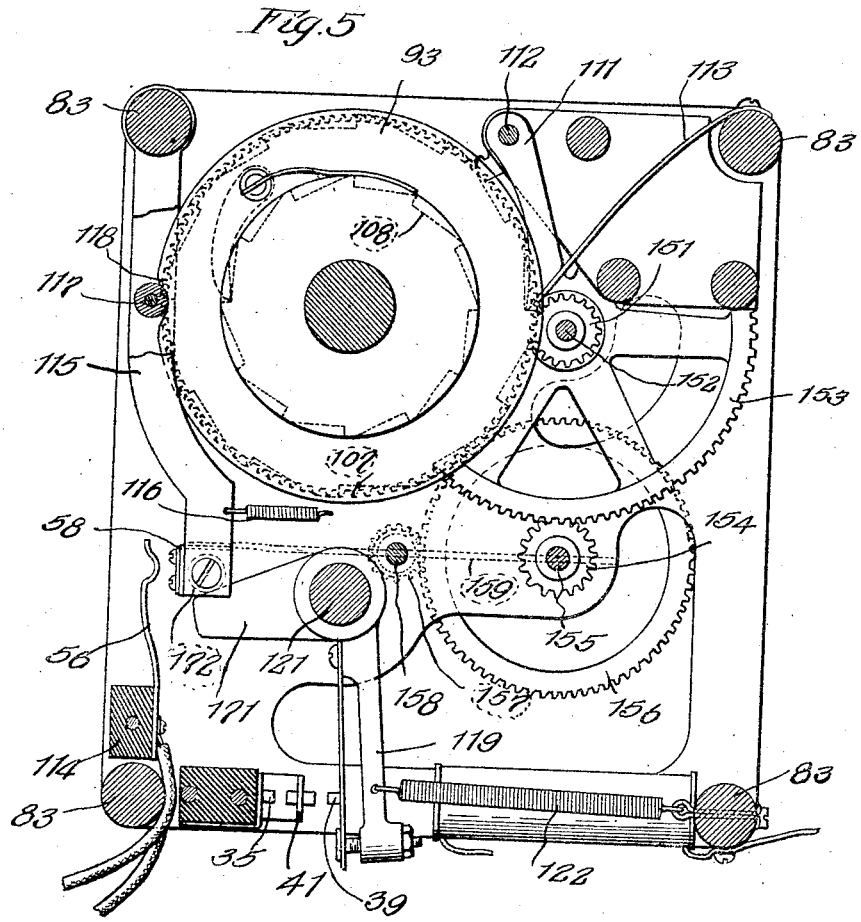
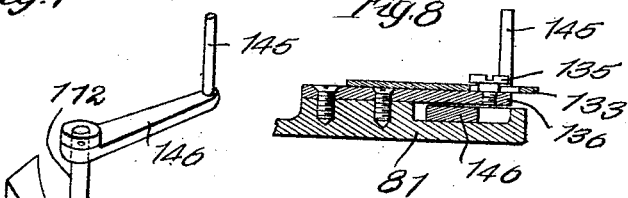
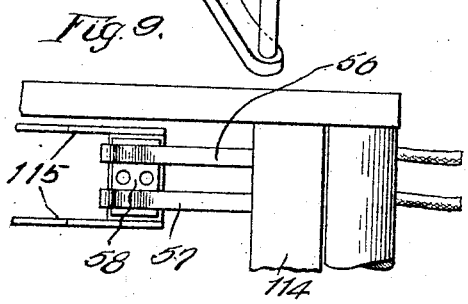

Patented Apr. 13, 1926.

1,580,319

UNITED STATES PATENT OFFICE.

HOWARD H. OSBORN, OF CHICAGO, ILLINOIS, ASSIGNOR TO H. G. FISCHER & CO., OF CHICAGO, ILLINOIS, A CORPORATION OF ILLINOIS.

TIMING DEVICE FOR DENTAL X-RAY MACHINES.

Application filed March 18, 1920. Serial No. 366,857.

*To all whom it may concern:*

Be it known that I, HOWARD H. OSBORN, a citizen of the United States, residing in Chicago, in the county of Cook and State of Illinois, have invented a new and useful Improvement in Timing Devices for Dental X-Ray Machines, of which the following is a specification.

This invention relates in general to apparatus for controlling X-ray circuits and, while the invention is hereinafter described in connection with the control of an X-ray apparatus for the taking of dental X-ray photographs and the like, it will be manifest that it has more general application.

A principal object of the present invention is the provision of a time control for an X-ray apparatus of simple construction and efficient and certain action, and at the same time capable of manipulation by operators without the need of complicated instruction.

A principal purpose of the invention is the provision in an X-ray apparatus of the character described for preventing the establishment of the circuits from imposing too heavy a load on the parts from too sudden inrush of current and to prevent dimming of the light of any ordinary electric light bulbs which may be receiving power from the same source.

Another important object of the invention is the provision for control of the filament circuit in accurate and desired relation with respect to the other circuits involved so that the filament circuit will be charged when and only when it is desired to take an X-ray exposure or make other use of the X-ray tube.

Another important object of the invention is the provision of a new and improved form of timing mechanism particularly adapted for use in X-ray apparatus, which will give exposures in substantially accurate predetermined periods throughout a range of considerable number of seconds.

Numerous other objects and advantages of the invention will be apparent as it is better understood from the following description, which taken in connection with the accompanying drawings discloses a preferred embodiment thereof.

On the drawings,

Fig. 2 is a side elevation of the timing mechanism, the casing of the apparatus being shown in section;

Fig. 5 is a section taken substantially on the lines 5—5 of Fig. 2;

Fig. 6 is a view taken at right angles of Fig. 2;

Fig. 7 is a detail perspective of the releasing pawl;

Fig. 8 is a section taken substantially on the line 8—8 of Fig. 3;

Fig. 9 is a detail view of the interengageable contacts of the secondary filament charging circuit.

Figure 10:
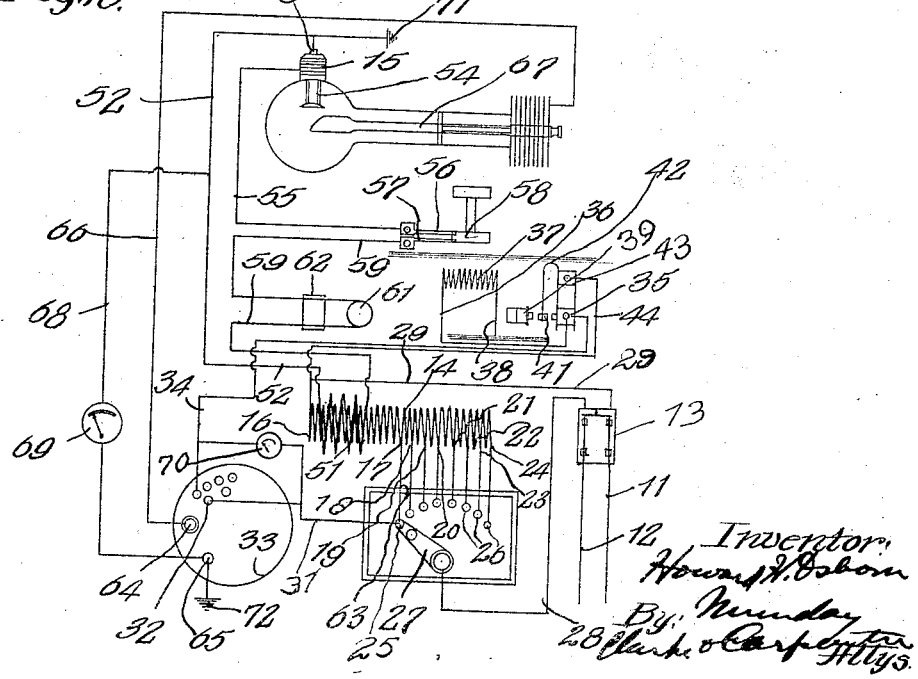
Fig. 10 is a diagrammatic view of the wiring of the entire apparatus.

Referring first to Fig. 10 which shows the wiring of the apparatus in diagrammatic form and which wiring it is believed should first be described, reference characters 11 and 12 constitute what may be termed line wires and lead to or may constitute a part of the wiring circuit for the ordinary electric lines in the building in which the apparatus is to be used. These wires are provided with a switch 13 of any ordinary or preferred construction.

The wiring provides circuits as follows, a primary charging circuit for a low tension transformer; a primary charging circuit for a high tension transformer; a secondary low tension filament circuit and a high tension discharging circuit for the X-ray exposure. The primary circuit of the low tension transformer (auto transformer) will first be described. In the apparatus itself is provided an auto-transformer, generally indicated at 14, which is used to provide the desired amount of current for the filament 15 of the X-ray tube itself. The auto-transformer comprises a main or principal exciting coil located between terminals 16 and 17 and auxiliary supplemental coils between terminals 17—18, 18—19, 19—20, 20—21, 21—22, 22—23 and 23—24, etc. From the terminals 17 to 21 wires lead to contacts 25 and 26, the contacts 26 being in number corresponding to the number of terminals 18 to 24. A switch arm 27 is provided to engage any of the contacts 25 or 26 and is permanently connected by a wire 28 with one side (12) of the line. The other side of the line (11) is connected by a wire 29 with the terminal 16 so that when the switch 13 is closed excitation of the primary coils of the auto-transformer is accomplished. I will now describe the primary circuit for the high tension transformer. A wire 31 connects terminal 25 with an appropriate one of a group of terminals 32 of the high tension transformer 33. A wire 34 connects a second terminal of the group 32 with one terminal 35 of the time switch. This terminal 35 is in turn connected by a wire 36 with a resistance coil 37 which is grounded at 38 in the frame of the apparatus. Reference character 39 indicates a movable contact, which, since it is not insulated from the frame of the apparatus, is also grounded and this contact is adapted to engage a double contact 41 carried on a spring leaf 42 of a secondary contact 43 of the time switch. The contact 43 is in turn connected by a wire 44 with wire 29 connected to the line wire 11. The primary circuit for high tension transformer, when the control lever 27 is in the position shown in Fig. 10, thus consists of wire 28, lever 27, wire 31, high tension transformer 33, wire 34, wire 36, resistance 37, contact 39, leaf 42, wire 44 and wire 29, to line wire 11. As will be presently described when the switch is thrown in the contact 39 moves to the right (viewing Fig. 10) engaging the contact 41 of leaf 42 and forcing contact 41 into engagement with contact 35 so that a shunt is provided around the resistance 37 which shunt comprises contacts 41 and 35 and leaf 42 so that the circuit almost immediately becomes wire 28, lever 27, wire 31, high tension transformer 33, wire 34, to contact 35, leaf 42 to contact 43 and wires 44 and 29. The purpose of the resistance 37 is to restrain the current and until excitation has developed in the high tension transformer protecting the parts against too great inrush of current and preventing dimming lights on the line and outside the apparatus. The purpose of providing the numerous terminals 32 is to permit adjustment within the high tension transformer in accordance with the line voltage and particular description of this arrangement need not be made.

The secondary circuit of the auto-transformer, which is the charging circuit for the filament of the X-ray apparatus, comprises coils 51 and wire 52 leading to one side 53 of the filament 54 in the X-ray tube and wire 55 leading from the other side of the filament to a circuit breaking device comprising line terminals 56 and 57 adapted to be interengaged to a connecting terminal 58 and wire 59 leading back to the coils 51. The wire 59 is preferably looped, as indicated at 61, and provided with a bridge 62 for varying slightly the resistance in this circuit.

The auto-transformer shown on the drawing is a step-down transformer and when the lever 27 is arranged as earlier described the strongest exciting circuit for the secondary coil is provided. This circuit comprises wire 28, lever 27, wire 63, the main part 14 of the primary coil and wire 29. When a weaker excitation of the filament is desired the lever 27 is moved in a clockwise direction to contacts 26, this movement of the lever providing a progressively weakening circuit depending upon its extent of movement to the right, the weakest position being that at the extreme right. So positioned the charging circuit for the high tension transformer comprises wire 28, lever 27, righthand contact 26, coil terminal 24 through the coils to contact 17, wire 63, contact 25, wire 31, high tension transformer 33, wire 34 and as before. The exciting circuit for the auto-transformer comprises wire 28, lever 27, contact 26, contact 24 through all the coils to contact 16 and back through wire 29. It is believed that intermediate positions will be readily apparent.

The high tension transformer is provided with two terminals 64 and 65 for the high tension secondary circuit and this circuit is as follows: contact 64 through wire 66 to pole 67 in the X-ray tube through filament 54 to wire 52, from wire 52 through wire 68 to contact 65 and a milliampere meter 69 is preferably provided in this circuit. The contacts 53 and 65 are grounded as indicated at 71 and 72 for protection of the operator. A voltmeter 70 may be provided if desired.

In accordance with my present invention it is intended that the filament charging circuit will be interrupted except at such times as it is desired to use the X-ray apparatus and this is the purpose of the use of the contacts 56 to 58. In the sequence of operation of the time switch, the mechanical features of which will be presently described, the contacts 56 and 57 are closed by the contact 58 as an initial step in the operation. Thereafter current is introduced into the primary circuit, passing first into the resistance 37 and then around it in the actual X-ray producing action. At the end of a desired predetermined period of X-ray tube excitation the primary circuit is first broken by the time switch and then immediately thereafter the filament circuit is broken at the contacts 56 and 58. This filament circuit is preferably completed by the setting of the apparatus to give it desired duration of operation after the establishment of the primary circuit and the filament circuit remains in closed position until the setting parts are returned to normal or inoperative positions.

The mechanical portion of the apparatus includes a start and stop motor particularly designed to the accomplishment of the ends of the present invention.

A frame comprising a top plate 81 and bottom plate 82 and connecting posts 83 at the corners is preferably provided. These posts extend up, as indicated at 84, for attachment to the underside of the top 85 of the cabinet, indicated at 86 in Fig. 1. A main shaft 87 having bearings at 88 and 89 in the bottom and top plates respectively is provided. This shaft is stationary and one end of a coil spring 91 is fixed to it and the other end secured in a cover or housing 92 loose on the shaft. This housing is provided with an outstanding peripheral flange 93 in which is pivotally mounted a post 94 having at one end a pawl 95 for engagement with a ratchet mechanism, to be presently described, and at the other a spring 96 bearing upon the outer face of the cover 92 and urging the pawl toward the ratchet. A circular opening 97 is provided in the top plate 81, the bearing 89 being located in an arm 98 extending into the opening. A sleeve 99 embraces the end of the shaft disposed above the arm and this sleeve is provided with an outwardly extending arm 101 having a pin 102 extending through the opening 97 and into the adjacent side of the cover 92. The sleeve is held in place by a screw 104 taking into the end of the shaft and is threaded to receive the lower end of a rotatable setting post 105 extending through the top 85 of the cabinet and having a hand knob 106 thereon.

The ratchet member comprises a central large gear 107 having a ratchet tooth portion 108 on one side for engagement with pawl 95 and having a ratchet tooth member 109 on the other side, the teeth of which are oppositely arranged with respect to the teeth of the ratchet member 108. A locking pawl 111 is fast on a pivot cross shaft 112 and pressed by a spring 113 against the ratchet portion 109. When the hand knob is turned the coil spring 91 is wound up, the ratchet pawl 95 riding idly over the teeth of ratchet portion 108, the ratchet member being held against movement under the action of the locking pawl 111.

An insulated bar 114 is positioned between the plates 81 and 82 and carries the two contacts 56 and 57 already mentioned. The contact 58 is carried in the end of a swinging yoke consisting of a pair of arms 115 pivoted on the post 83 adjacent the shaft 87. A coil spring 116 normally pulls this yoke in a counter-clockwise direction, viewing Fig. 5, moving the contact 58 away from the contacts 56 and 57. A roller 117 is mounted between the yoke arms 115 and in position to engage the flange 93 (already described), which flange is provided with a recess 118 of a shape to cause the roller to roll over the surface on to the larger circumference of the flange and bring the contact 58 into engagement with the contacts 56 and 57, whereby the flange acts as a cam to establish the connection between these contacts. This action occurs as will be readily appreciated when the apparatus is set.

Figure 1:
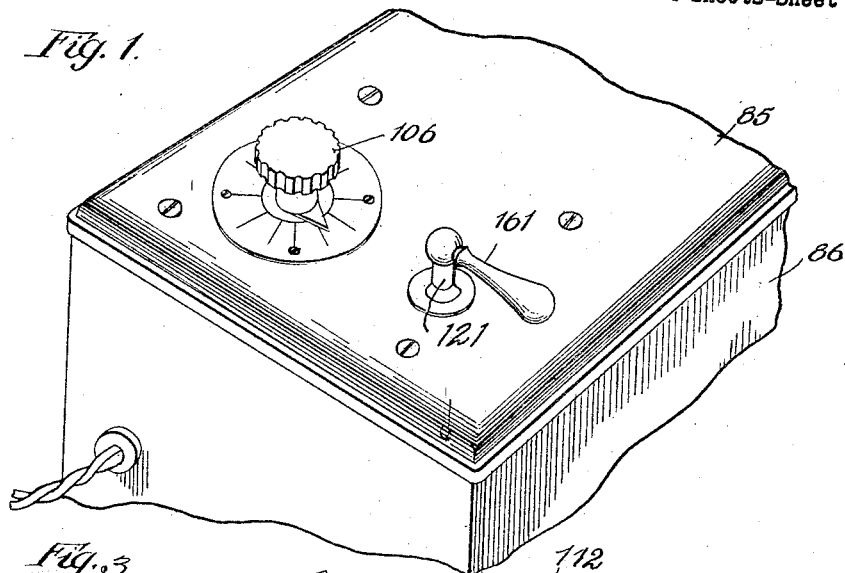
Figure 1 is a perspective view of part of the physician's dental X-ray photographic apparatus.
Figure 3:
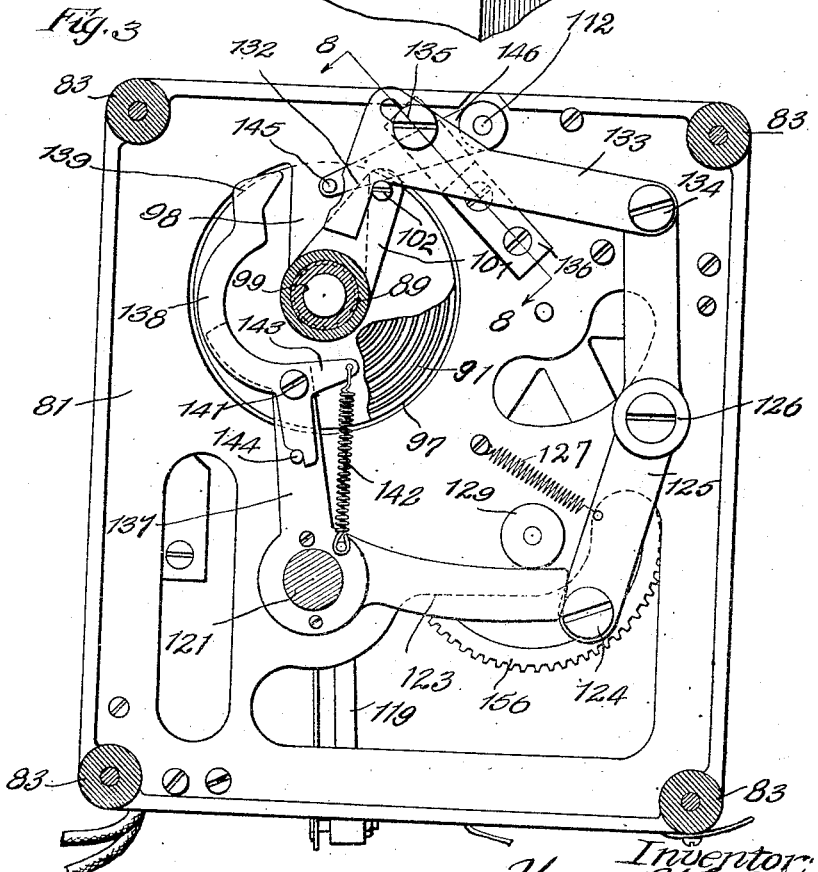
Fig. 3 is a section taken substantially on the line 3—3 of Fig. 2 and showing the parts in normal arrangement.
Figure 4:
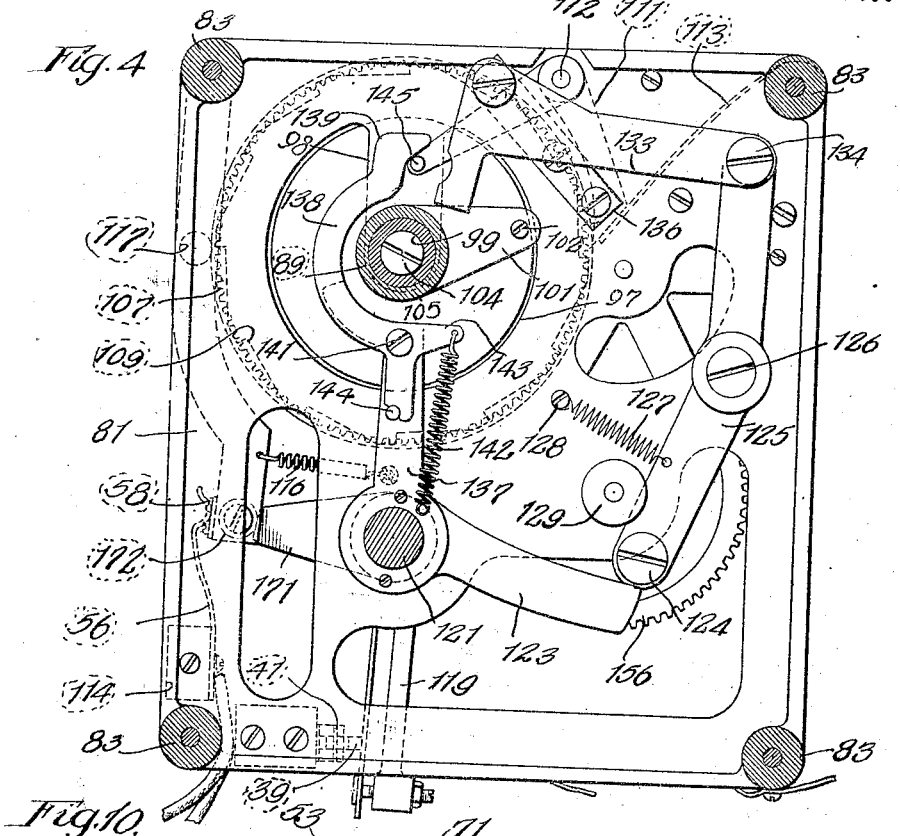
Fig. 4 is a section on the same line showing the parts arranged in operative relation.

As has been already stated, the contact 39 in the primary circuit is a movable one and is carried upon the end of an arm 119 fixed upon a cross pivoted shaft 121 having bearings in the frame plates, and having also an end extending above the top of the cabinet as indicated in Fig. 1. This arm is normally pulled away from contacts 41 and 35 by the spring 122 connecting it with an appropriate post 83. The shaft 121 is provided with an arm 123 fixed upon it and located above the top plate 81. This arm normally lies in front of a roller 124 (Fig. 3) upon the end of a lever 125 pivoted at 126 on the top plate and this lever is normally pulled in a clockwise direction by a spring 127 connected with the lever and with a post 128 on the top plate. The normal position of the arm 123 and lever 125 is that shown in Fig. 3, the arm 123 resting against a roll 129 and in front of the roll 124 of the lever 125. After the apparatus has been set the shaft 121 is rotated to establish contact between contacts 39, 41 and 35 thus moving the arm 123 in a clockwise direction (viewing Fig. 3) and permitting the roll 124 to be pulled in place beneath it as shown in Fig. 4. The parts remain in this position until the arm 101 (already described) returns to normal position when the post 102 on arm 101 engages an angle arm 132 on a link 133 connected at 134 with the lever 125, this link having a sliding guiding connection with a pin 135 mounted upon a bar 136 fast upon the top of the top plate.

The shaft 121 also is provided with another arm 137 carrying at its end a yielding member 138 curved to permit its active end 139 to extend around the shaft 87 and the parts carried by it. This yielding member is pivoted on the arm at 141 and is pulled in a clockwise direction by a spring 142 engaging a lug 143 and holding the member against a stop 144. The active end 139 of the member is adapted to engage an upstanding pin 145 on an arm 146 fast on a shaft 112. The arm 146 is movable beneath an end 147 of the bar 136. On this shaft 112 is fastened the pawl member 111. This construction causes rotation of the shaft 121 to release and hold out of engagement the pawl 111 so that the power stored in the spring may be released and in the unwinding action the parts return to normal position. The shaft 21 may be rotated by providing an arm 161 on its end extending through the top 85 of the cabinet.

A timing mechanism is provided which will now be described. The gear part 107 of the ratchet member engages a pinion 151 upon a shaft 152 having bearings in the frame plates and this shaft carries a gear 153 of relatively large size and meshing with a pinion 154 upon a shaft 155 likewise having bearing in the frame parts and carrying a gear 156 in turn meshing with a pinion 157 upon a shaft 158. This shaft 158 extends out beneath the bottom plate and carries a fan member 159 which acts as a retardant slowing up the unwinding action of the spring. The size of the fan and the ratio of the several intermeshing gears are such that the teeth on the ratchet part 108 produce single half second intervals. That is to say, for each winding up of the spring through the setting base 105 and knob 106 the advance of the pawl from one tooth to the next requires or produces a half second of time in the unwinding action.

As the parts unwind the arm 101 returns to normal position as has been stated and through the link 133 moves out the lever 125 and permits the breaking of the contacts 39—41 and 35. This action also moves the yiedingly held member 138 away from the post 145 of the locking pawl control and permits relocking.

It is intended that the contacts 56 and 57 shall be maintained in interengagement with the contact 58 until after the contacts 35, 42 and 39 are disengaged, and to this end I provide upon the shaft 121 an arm 171 normally disposed above a roller 172 carried behind the contact 58 in the yoke formed by the arm 115. As has been stated the setting of the device moves this yoke to the left (viewing Fig. 5) and movement of the shaft 121 to establish the contact between the points 39, 41 and 35 disposes this arm back of the roller 172 and prevents disengagement of the contacts 56 and 58 until after the breaking of the contacts 39, 41 and 35. The dimensions of these parts are preferably such that movement of the arm 171 in engagement with the roller 172 will move the yoke out a slight distance to disengage the roll 117 from the face of the cam flange 93.

In operation, it is only necessary for an operator to close the line switch 13 which may remain closed during successive operation, timing the exposure by rotating the knob 106 and then tripping the device by means of the handle 161. Thereafter, the operation is entirely automatic, as previously described. These operations may be successively repeated upon occasion.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a time control for X-ray apparatus, the combination of a primary charging circuit, a time switch in said circuit, electrical resistance, and mechanical mechanism operated by said switch for positively including said resistance in said circuit during a short period immediately following completion of the circuit through the movement of the time switch.

2. In a time control for X-ray apparatus, the combination of a primary charging circuit, a time switch in said circuit, electrical resistance, a relatively non-resistant shunt, a mechanical mechanism operated by said switch for positively including said resistance in said circuit during a minute period after the completion of the circuit and thereafter including said relatively non-resistant shunt to permit the bulk of current to flow through the circuit and without passing through said electrical resistance.

3. In a time control for X-ray apparatus, the combination of a primary charging circuit, a switch in said circuit, an electrical resistance, and a relatively non-resistant shunt, said resistance and said shunt being connected parallel at one side in said circuit and said switch making successive contact with the other side of said resistance and said shunt to successively complete the circuit first through the resistance and then through said shunt.

4. In a time control for X-ray apparatus, the combination of a primary charging circuit and a secondary filament charging circuit having interengageable contacts, and a time switch in said primary circuit including a time setting and a primary circuit closing mechanism, and means operable by said setting mechanism for engaging said contacts.

HOWARD H. OSBORN.